(12) United States Patent
Danna et al.

(10) Patent No.: US 11,746,475 B2
(45) Date of Patent: Sep. 5, 2023

(54) METHOD AND ASSEMBLY FOR MAKING A CONCRETE EXPANSION JOINT INSERT

(71) Applicant: JD RUSSELL COMPANY, Utica, MI (US)

(72) Inventors: Nicholas Danna, Tucson, AZ (US); Bradley Danna, Shelby Township, MI (US); Marc Danna, Tucson, AZ (US)

(73) Assignee: JD RUSSELL COMPANY, Utica, MI (US)

( * ) Notice: Subject to any disclaimer, the term of this patent is extended or adjusted under 35 U.S.C. 154(b) by 135 days.

(21) Appl. No.: 17/168,814

(22) Filed: Feb. 5, 2021

(65) Prior Publication Data

US 2021/0214900 A1 Jul. 15, 2021

Related U.S. Application Data

(62) Division of application No. 15/836,004, filed on Dec. 8, 2017, now abandoned.

(60) Provisional application No. 62/432,090, filed on Dec. 9, 2016.

(51) Int. Cl.
*E01C 11/04* (2006.01)
*E04B 1/68* (2006.01)
*E01C 11/10* (2006.01)
*B29C 48/00* (2019.01)

(52) U.S. Cl.
CPC .............. *E01C 11/04* (2013.01); *B29C 48/00* (2019.02); *E01C 11/106* (2013.01); *E04B 1/68* (2013.01); *E04B 1/6812* (2013.01)

(58) Field of Classification Search
CPC ........ E01C 11/10; E01C 11/106; E01C 11/02; E01C 11/103; E01C 11/04; E01C 11/12; E01C 11/123; E01C 11/126; E04B 1/68; E04B 1/6812; E04B 1/6801
See application file for complete search history.

(56) References Cited

U.S. PATENT DOCUMENTS

| 2,294,247 | A | | 8/1942 | Smith |
| 3,330,187 | A | * | 7/1967 | Kohler .................... E01C 11/10 264/173.17 |
| 3,334,557 | A | | 8/1967 | Fitzgibbon |
| 3,406,087 | A | | 10/1968 | Potter |
| 3,422,054 | A | | 1/1969 | Kelly |
| 3,503,311 | A | | 3/1970 | Gagle et al. |
| 3,856,741 | A | | 12/1974 | Lovell et al. |
| 3,877,829 | A | | 4/1975 | Honegger |

(Continued)

OTHER PUBLICATIONS

DSM System Tech Data, Watertight Joint System for Decks and Below-Grade Walls, Jun. 2016, EMSEAL, https://cdn.emseal.com/wp-content/uploads/2016/06/dsm-system-tech-data-watertight-expansion-joint-emseal.pdf (Year: 2016).

*Primary Examiner* — Abigail A Risic
(74) *Attorney, Agent, or Firm* — Carlson, Gaskey & Olds, P.C.

(57) ABSTRACT

An illustrative example embodiment of an assembly for making a concrete expansion joint insert includes an extruder a device that receives material from the extruder. The device includes a flow path through the device and at least one internal feature that directs the material away from a middle of the flow path and toward outside edges of the flow path to establish an approximately equal flow rate of the material through the middle and outside edges of the flow path.

23 Claims, 6 Drawing Sheets

(56) References Cited

U.S. PATENT DOCUMENTS

| | | | |
|---|---|---|---|
| 3,953,661 | A | 4/1976 | Gulley |
| 4,403,067 | A | 9/1983 | Uffner |
| 4,522,413 | A | 6/1985 | Nicholas |
| 4,548,009 | A | 11/1985 | Dahowski |
| 4,952,104 | A | 8/1990 | Osada |
| 5,130,176 | A | 7/1992 | Baerveldt |
| 5,865,009 | A | 2/1999 | Jackson et al. |
| 5,935,695 | A | 8/1999 | Baerveldt |
| 6,418,688 | B1 | 7/2002 | Jones, Jr. |
| 6,616,877 | B2 | 9/2003 | Close et al. |
| 6,624,232 | B2 | 9/2003 | Wilson, Sr. |
| 8,088,858 | B2 | 1/2012 | Pharr |
| 9,506,206 | B2 | 11/2016 | Pucciarelli |
| 9,719,248 | B1 | 8/2017 | Meacham |
| 2003/0093966 | A1 | 5/2003 | Chang |
| 2006/0117692 | A1 | 6/2006 | Trout |
| 2008/0115440 | A1 | 5/2008 | Fortney et al. |
| 2008/0274306 | A1 | 11/2008 | Moore |
| 2008/0282935 | A1 | 11/2008 | Miller |
| 2008/0315531 | A1 | 12/2008 | Hrovath |
| 2012/0082512 | A1 | 4/2012 | Cureton |
| 2013/0231432 | A1 | 9/2013 | Pharr |
| 2014/0219719 | A1 | 8/2014 | Hensley et al. |
| 2017/0284083 | A1 | 10/2017 | Hensley et al. |

\* cited by examiner

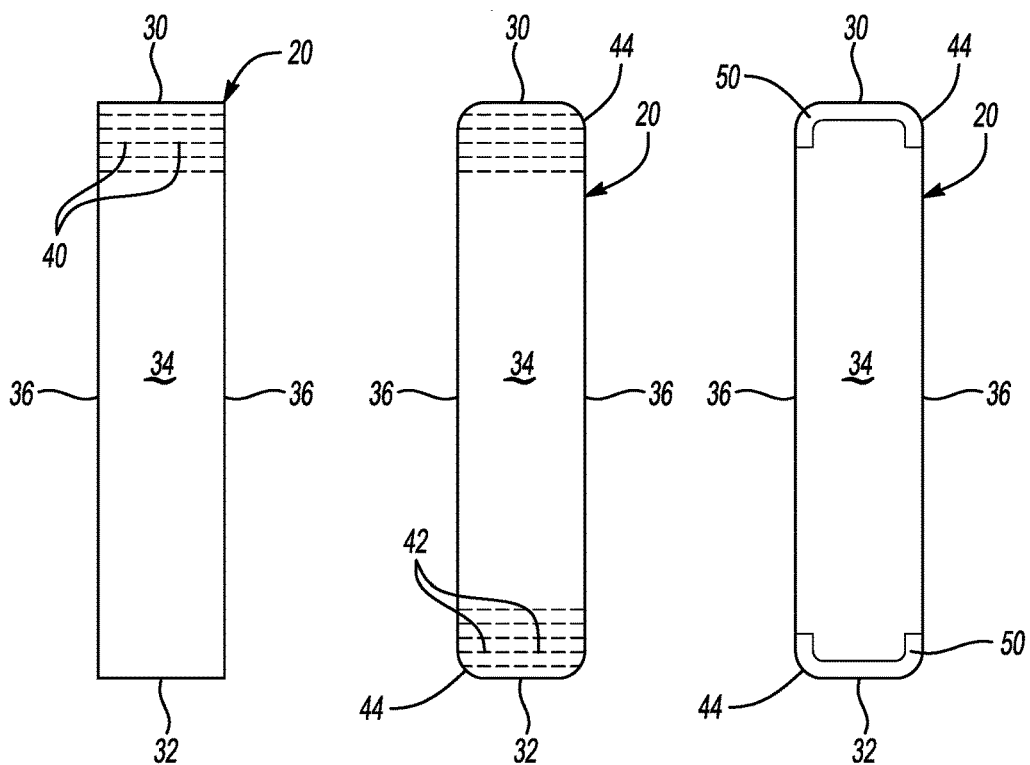
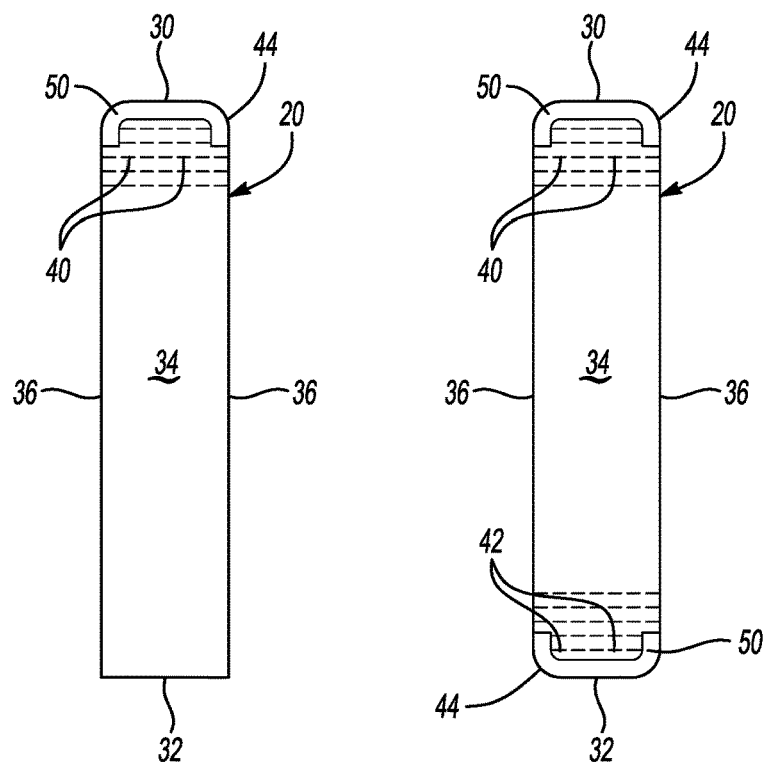

METHOD AND ASSEMBLY FOR MAKING A CONCRETE EXPANSION JOINT INSERT

CROSS REFERENCE TO RELATED APPLICATIONS

This is a divisional application of U.S. patent application Ser. No. 15/836,004, filed Dec. 8, 2017, which claims priority to U.S. Provisional Application No. 62/432,090, filed on Dec. 9, 2016.

BACKGROUND

Concrete has been in widespread use for a variety of surfaces, including roads and walkways. Given that concrete is a generally porous material and is exposed to changing weather conditions, expansion joints between sections or slabs of the concrete accommodate expansion and contraction of the concrete. Many expansion joints include an insert or filler within the space between the sections or slabs of concrete. Traditional expansion joint inserts were made using materials such as wood, paper and asphalt. More recently, recycled rubber expansion joint inserts were introduced.

U.S. Pat. No. 6,616,877 describes a technique for using recycled rubber, such as that available from used vehicle tires, for making concrete expansion joint material. According to the teachings of that document, relatively large sheets of recycled rubber-based material can be cut to a desired size for different installations to accommodate different thicknesses of concrete, for example.

SUMMARY

An illustrative example embodiment of an assembly for making a concrete expansion joint insert includes an extruder a device that receives material from the extruder. The device includes a flow path through the device and at least one internal feature that directs the material away from a middle of the flow path and toward outside edges of the flow path to establish an approximately equal flow rate of the material through the middle and outside edges of the flow path.

An illustrative example embodiment of a method of making a concrete expansion joint insert includes extruding a material into a device, directing the material along a flow path through the device, and directing the material away from a middle of the flow path and toward outside edges of the flow path to establish an approximately equal flow rate of the material through the middle and outside edges of the flow path.

Various features and advantages will become apparent to those skilled in the art from the following detailed description of example embodiments. The drawings that accompany the detailed description can be briefly described as follows.

BRIEF DESCRIPTION OF THE DRAWINGS

FIG. 4 is an end view of an example embodiment.

FIG. 5 is an end view of another example embodiment.

FIG. 6 is an end view of another example embodiment.

FIG. 7 is an end view of another example embodiment.

FIG. 8 is an end view of another example embodiment.

DETAILED DESCRIPTION

Figure 1:
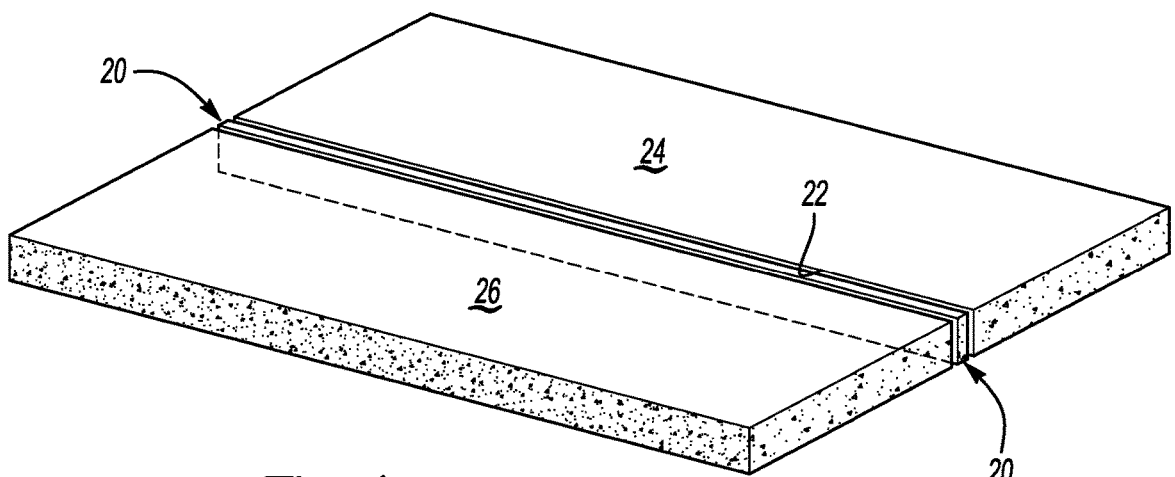
FIG. 1 diagrammatically illustrates a concrete expansion joint including an insert designed according to an embodiment of this invention.

FIG. 1 shows a concrete expansion joint insert 20 within an expansion joint 22 between two sections or slabs of concrete 24 and 26.

Figure 2:
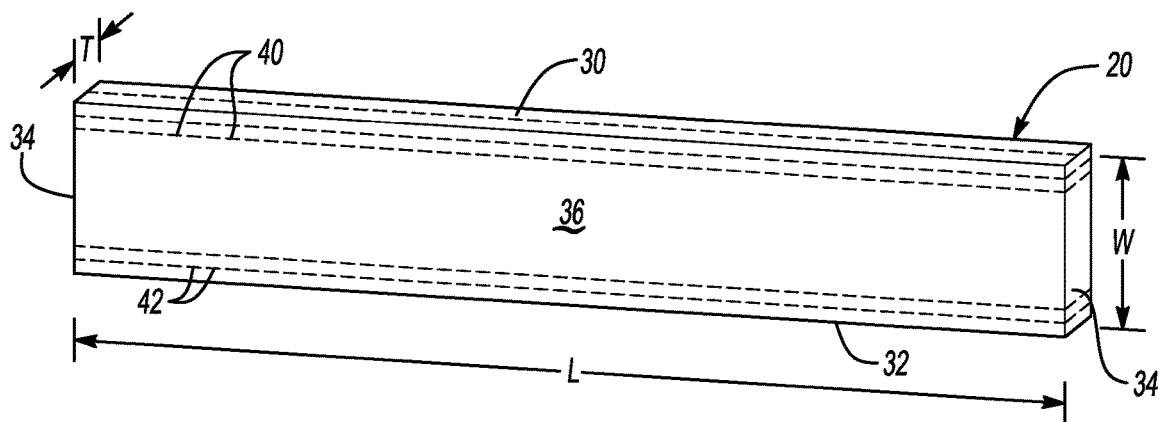
FIG. 2 is a perspective illustration of an example embodiment of a concrete expansion joint insert.

FIG. 2 illustrates an example embodiment of a concrete expansion joint insert 20. In this example, the insert 20 includes a body having longitudinal edges 30 and 32 that extend between ends 34 of the body. Side surfaces 36 are between the longitudinal edges 30 and 32 and between the ends 34. Only one of the side surfaces 36 is shown in the illustration of FIG. 2.

The insert 20 of FIG. 2 is made or molded with a width W and thickness T. The insert 20 may be cut to length to have a finished length L. The length L and thickness T correspond to dimensions of the longitudinal edges 30 and 32, respectively. The thickness T and width W correspond to dimensions of the ends 34. The width W and length L correspond to dimensions of the side surfaces 36.

In some examples, the width W varies between two inches and twelve inches. Many concrete installations include slabs that have a thickness on the order of 3.5 inches, 4 inches or 6 inches. The width W is selected to correspond to the thickness of the concrete in such examples.

The thickness T may vary between 0.25 inches and 1 inch. Many expansion joints have a gap size of approximately one-half inch and the insert 20 will have a thickness T of one-half inch for such installations.

As schematically shown at 40, the longitudinal edge 30 and an adjacent portion of the side surfaces 36 has a different surface characteristic compared to, for example, most of the side surfaces 36. The surface characteristic schematically illustrated at 40 may include a color or texture of the corresponding portion of the insert body. For example, the side surfaces 36 may be black because the insert 20 is made from recycled tire rubber and the color of the longitudinal edge 30 schematically represented at 40 may be grey to approximately match the color of concrete with which the insert 20 will be associated when installed as shown in FIG. 1, for example.

In the example of FIG. 2, the other longitudinal edge 32 has a different surface characteristic schematically shown at 42 compared to, for example, most of the side surfaces 36. The surface characteristic schematically shown at 42 may be a color or texture. For example, the surface characteristic 42 may be a smooth texture while most of the exposed side surfaces 36 have a relatively rough texture. The rough texture on the side surfaces 36 cooperates with the surface of the concrete against which the insert will be received to reduce or avoid relative movement between the concrete and the expansion joint insert 20, which facilitates maintaining the insert in a desired position over time.

Figure 3:
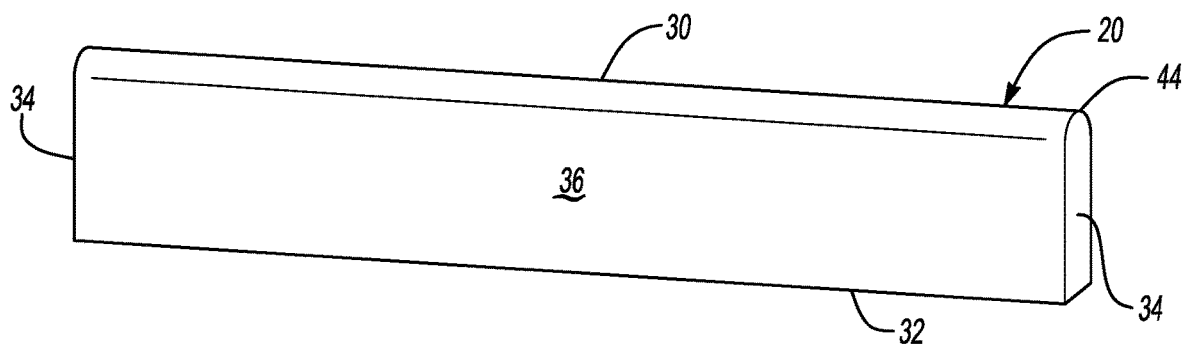
FIG. 3 is a perspective illustration of another example embodiment of a concrete expansion joint insert.

FIG. 3 illustrates another embodiment of an insert 20. In this example, the longitudinal edge 30 has a surface characteristic that includes a rounded profile shown at 44. In this example, the opposite longitudinal edge 32 has an angled profile, which corresponds to a squared edge.

Surface characteristics, such as color, texture and profile, may be used in different combinations and provided on different portions of an expansion joint insert 20 designed according to an embodiment of this invention. FIG. 4 is an end view of an insert 20 that illustrates one example in which the surface characteristic 40 on and near the longitudinal edge 30 is a different color compared to a remainder of the body of the insert 20. The color is selected to correspond to a color of concrete so that the insert 20 of FIG. 4 may be placed in an expansion joint with the longitudinal edge 30 facing upward where it will be exposed. Having a color of the longitudinal edge 30 approximately match the color of concrete provides a more visually appealing overall result for a concrete installation. At the same time, the insert 20 may be made from recycled rubber, such as that available from used vehicle tires. Having only a portion or edge of the insert 20 colored to approximately match concrete allows for taking advantage of the economies associated with using recycled rubber without introducing additional cost for coloring the entire insert 20. When installed, only the top portion of the insert along the longitudinal edge 30 will be exposed so the color of the remainder of the insert does not matter for visual appearance purposes.

FIG. 5 illustrates another example embodiment from an end view. In this example, the longitudinal edges 30 and 32 each have a different surface characteristic compared to a remainder of the body of the insert 20. In this example, each of the longitudinal edges 30 and 32 has a rounded profile 44 in which the corners where the longitudinal edges 30 and 32 respectively meet the side surfaces 36 are rounded with a portion of the longitudinal edges being generally planar. Each of the longitudinal edges has a different color compared to a remainder of the body of the insert 20 in this example. The color schematically shown at 40 may be the same as the color schematically shown at 42 or the colors may be different, which allows an installer to select an appropriate longitudinal edge 30 or 32 to be exposed at the installation site depending on the mix of concrete being used at that installation.

FIG. 6 illustrates another example embodiment in which the longitudinal edges 30 and 32 have a rounded profile 44 as part of a surface characteristic at the edges. Another feature of this example is that a coating 50 is provided on the edges 30 and 32. One feature of the coating 50 is that it adds stiffness to the insert 20, which facilitates the longitudinal edges remaining in a straight line. In one example embodiment, the coating 50 is established using a rigid polymer that is applied along each longitudinal edge.

One example polymer used in some embodiments comprises polyethylene. Recycled low density polyethylene is included in some examples. Embodiments that provide a more rigid outer longitudinal edge 30 or 32 include high density recycled polyethylene. Such materials provide the ability to establish a smoother texture along the longitudinal edge compared to the body when the body is made of recycled rubber. In some embodiments the entire insert 20 is made from recycled polyethylene with a different density included along the at least one longitudinal edge to provide the different surface characteristic along that edge.

In one example, the coating 50 has a thickness that is on the order of 0.05 inches. In some examples, the coating thickness is selected to be between 0.025 and 0.1 inches thick. In one preferred embodiment, the thickness of the coating 50 is 0.06 inches. In the example of FIG. 6, the surface characteristic of each of the longitudinal edges 30 and 32 includes a rounded profile and a smooth texture. The coating 50 is used in this example to provide a smooth texture.

In an example embodiment, the coating 50 extends onto a portion of the side surfaces 36 a distance that corresponds to approximately the thickness T dimension of the longitudinal edge.

FIG. 7 illustrates another example embodiment in which the longitudinal edge 30 is different than the longitudinal edge 32 because the former includes a surface characteristic comprising a color 40 that is different than a remainder of the body of the insert 20, a rounded profile 44 and a smooth texture. In this example, the longitudinal edge 30 includes a coating 50 of a material, such as a rigid polymer. The polymer material is selected to withstand outdoor expose to the elements and may include an ultraviolet light inhibitor to increase the lifetime of the desired look of the longitudinal edge 30 of the expansion joint insert 20.

FIG. 8 is an example embodiment that includes a combination of all of the features of the previously described examples along both longitudinal edges 30 and 32. As those skilled in the art who have the benefit of this description will appreciate, a variety of combinations of different surface characteristics at one or both of the longitudinal edges of an insert may be utilized to meet the needs of a particular installation.

Figure 9:
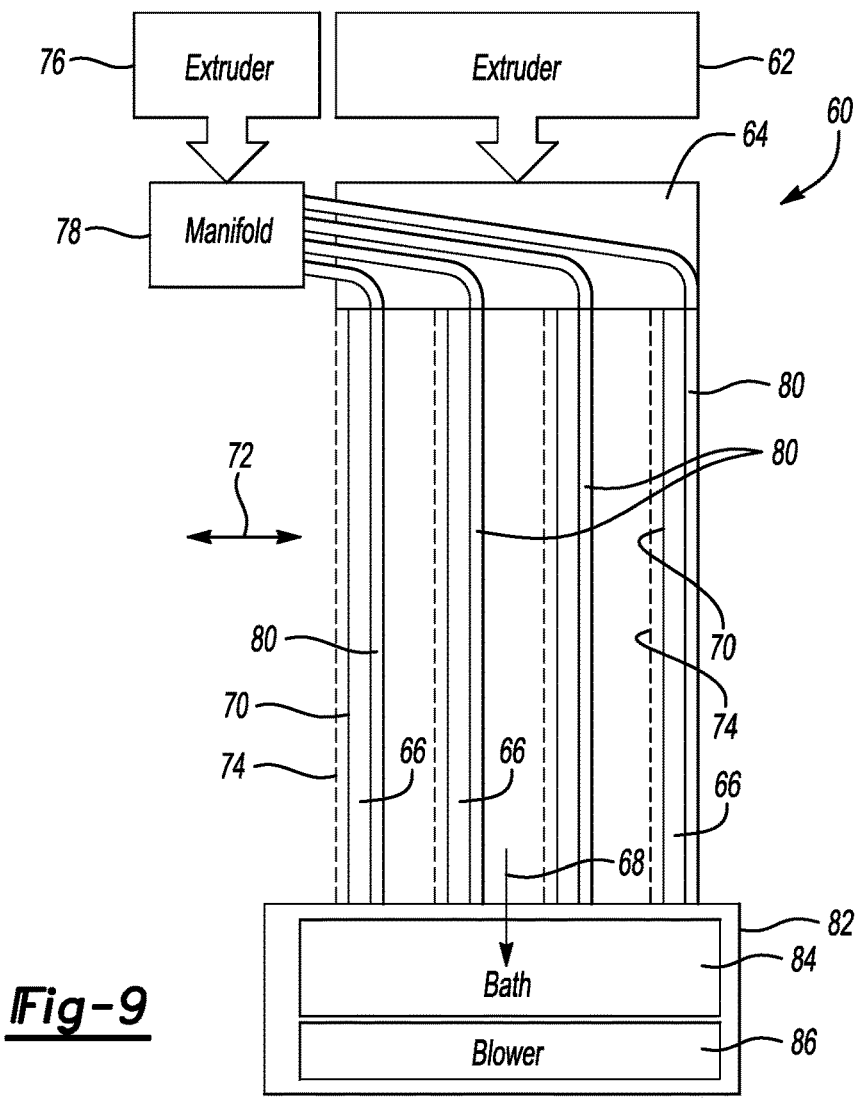
FIG. 9 schematically illustrates a device for manufacturing concrete expansion joint inserts according to an example embodiment.

FIG. 9 schematically illustrates one example type of device 60 useful in some embodiments for manufacturing inserts 20 having width W and thickness T dimensions that are preset to correspond to the dimensions desired for installation. In other words, the device 60 provides elongated strips of insert material instead of generating or yielding a sheet of material that is subsequently cut into strips.

The device 60 includes an extruder 62 for extruding material, such as recycled rubber into a manifold 64 that distributes the extruded material into individual channels 66. The material flows through the channels 66 in the direction shown by the arrow 68. The channels in this example have an adjustable dimension to achieve different width W dimensions of the inserts.

One side 70 of each channel 66 is adjustable relative to an opposite side of the channel as schematically shown by the arrow 72. The side 70 of each channel 66 may be adjusted from a smaller width W dimension to a larger width W dimension as schematically shown in phantom at 74. The adjustable feature of the channels 66 allows for making different sized inserts without requiring a completely separate die channel and without requiring complex changes to the device 60.

The device 60 includes the ability to provide a second or different surface characteristic along at least one of the longitudinal edges of an insert produced by the device 60. In the illustrated example, another extruder 76 extrudes material into a manifold 78 that distributes the material along secondary channels 80 that are situated along one of the longitudinal edges of the channels 66. Such an arrangement allows for coextruding two materials so that at least one longitudinal edge of the insert has a different surface characteristic compared to another portion of the insert.

In one example, the extruder 76 extrudes the same base recycled rubber material as extruded from the extruder 62 except that an additional component is added, such as a colorant. For example, a mineral or chemical additive may be included to change the color of the material extruded by the extruder 76 and distributed by the manifold 78. For some examples having a coating 50, such as that shown in FIGS. 6-8, the material distributed through the manifold 78 includes very fine granular rubber, recycled thermoplastic polymer binder and a mineral or chemical colorant with a polymer additive. Such an embodiment includes a smooth and stiff longitudinal edge on the insert 20. In some such examples, the channel 80 has a generally C-shaped configuration and the channel 66 has a correspondingly shaped configuration so that the coating 50 is applied along and across the longitudinal edge and extending over a portion of the side surfaces. In some examples, the coating 50 extends along the entire length and over approximately 0.5 to 0.75 of an inch on the side surfaces 36.

Depending on the desired resulting insert, the device 60 may be configured to provide co-extrusion along both longitudinal edges and to introduce different features or surface characteristics to meet a variety of installation needs. In one example, the extruders 62 and 76 comprise twin screw extruders while other embodiments include a single screw extruder. In some examples, the coating 50 is applied in a separate device after the rubber material of the insert has been extruded and at least partially cured.

The example device 60 includes a cooling station 82 where the extruded material for the inserts 20 is treated to control the final dimensions of the inserts. In this example, the material exiting the channels 66 enters a cooling bath 84 containing water. Cooling water quenches and strengthens the material of the insert. The cooling station 82 includes a blower 86 that directs high volumes of cooled air at the inserts as they exit the quenching water bath 84 of the cooling station 82. Water that is removed from the insert material is collected, filtered and recycled back into the cooling bath 84.

Figure 10:
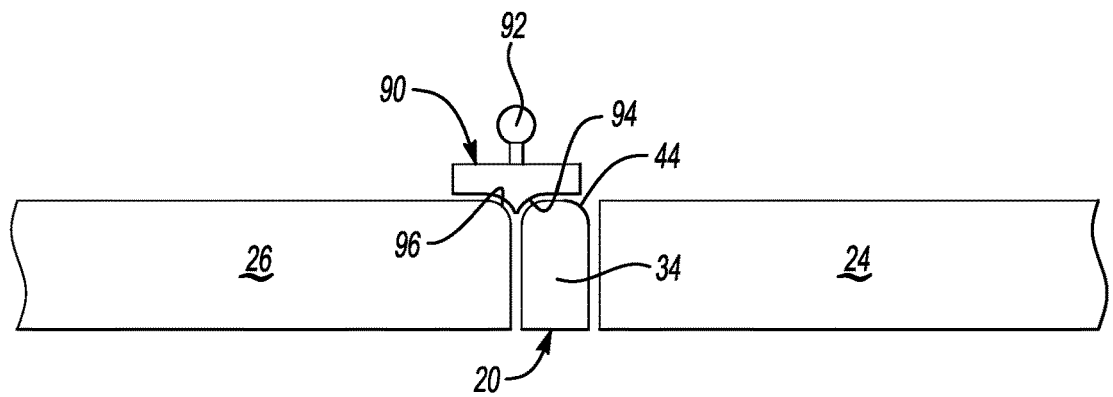
FIG. 10 schematically illustrates a feature of an example embodiment of an insert in use.

FIG. 10 illustrates an example use of an insert 20 that has a rounded edge profile 44 on at least one of the longitudinal edges. A concrete finishing tool 90 includes a handle 92 and a finishing surface 94 configured to establish a rounded or chamfered edge on the concrete along the expansion joint. In this example, the profile of the longitudinal edge of the insert 20 corresponds to the profile of the finishing surface 94 on the tool 90. The insert 20 in this example provides a guide surface along which an individual can move the finishing tool 90 to establish a desirable looking, straight, finished edge 96 on the concrete.

Figure 11:
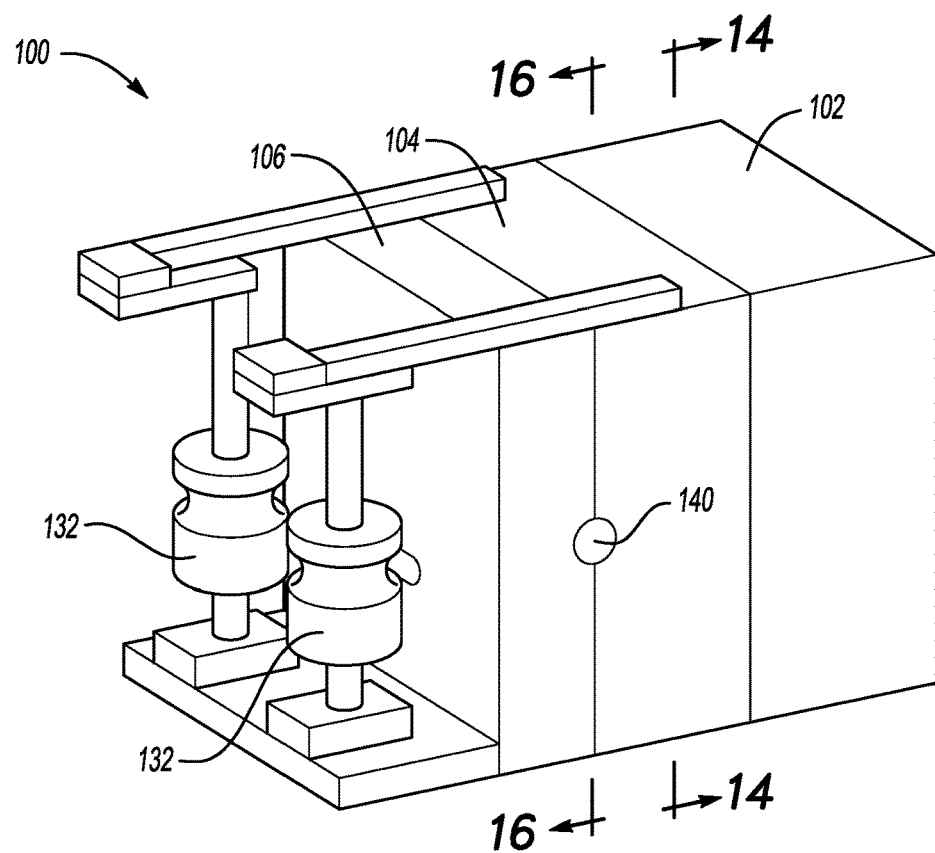
FIG. 11 diagrammatically illustrates selected portions of a device for manufacturing concrete expansion joints according to an example embodiment.

FIG. 11 illustrates another example device for making an insert 20 designed according to an embodiment of this invention. The device 100 of this example includes a unique die flow path configuration designed to control how extruded material, such as recycled rubber, flows through the device 100. The example device 100 can be considered to have three sections including an entrance section 102 that is configured to be coupled to an extruder (not shown in FIG. 11), an intermediate section 104, and an exit section 106. The extruder coupled to the entrance section 102 in some embodiments comprises a known single screw extruder configuration.

Figure 12:
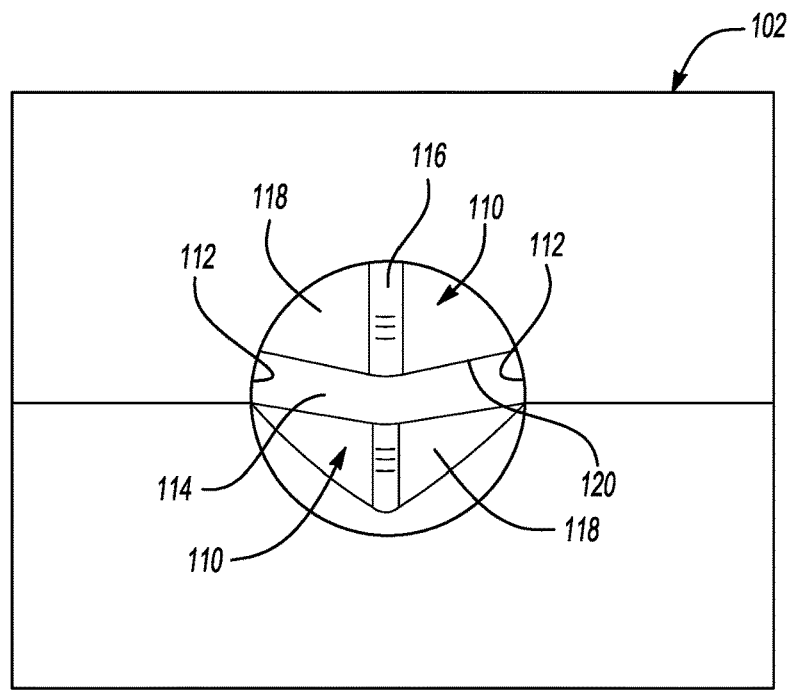
FIG. 12 illustrates features of the device of FIG. 11 as seen from an entrance side.
Figure 13:
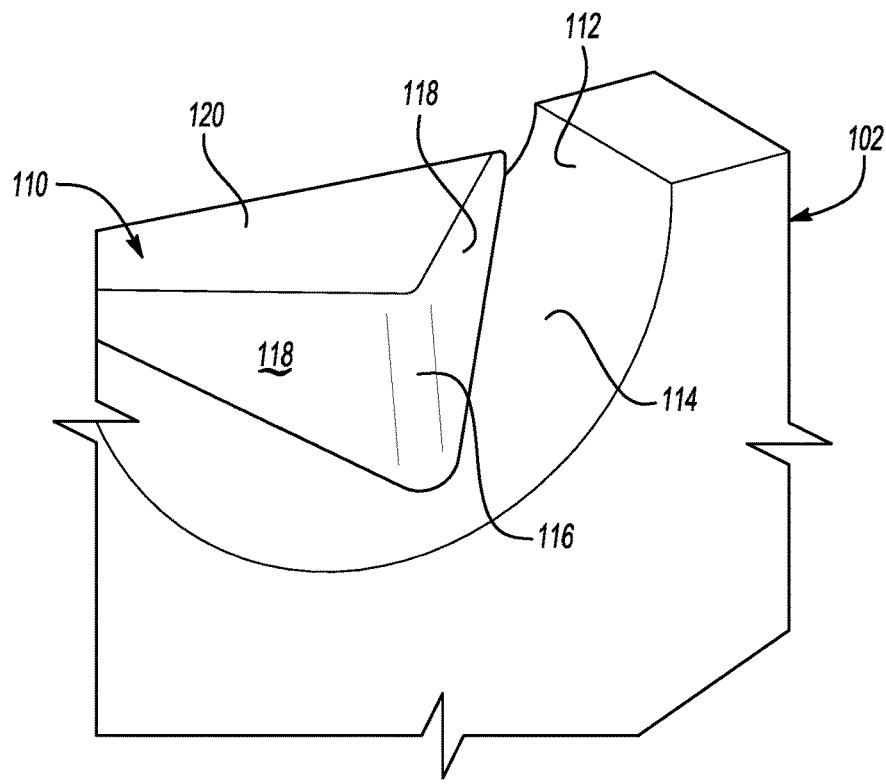
FIG. 13 illustrates a material flow control feature of the device of FIG. 11.

One challenge associated with realizing an insert 20 sized for use as described above (e.g., not requiring a large sheet to be cut into strips sized for use) is achieving proper material flow through a die. As can be appreciated from FIGS. 12 and 13, the illustrated example includes at least one wedge 110 inside the entrance section 102 that directs some of the extruded material (e.g., recycled rubber) away from a center or middle of the flow path 111 and toward outer edges 112 of the flow path 111. This example includes two wedges 110. Urging or directing some material outward along the wedges 110 effectively decreases the amount of material near the center of the flow path 111 at least along a portion of the flow path 111 while effectively increasing the amount of material flowing closer to the outer edges 112.

Without the wedges 110 or another flow control feature to direct material flow in this manner, there would be a tendency for more material along the middle portion of the flow path 111 because there otherwise would be less flow resistance along the middle portion of the flow path 111 resulting in inconsistent material thickness or density on different portions of the resulting product. The flow directing and restricting wedges 110 contribute to achieving a consistent and desired material composition for the entire insert 20.

In this example the wedges 110 interrupt or partially fill a conical passage 114 of the entrance section 102. The wedges 110 each have a leading edge 116 that is rounded off in this example. Side edges 118 of the wedges are planar and have a decreasing dimension in a flow direction through the entrance section 102 (e.g., right to left in FIG. 11 or into the page in FIG. 12). Opposing surfaces 120 of the wedges 110 face each other and are spaced apart in this example by a distance corresponding to a desired thickness T of an insert 20 formed through the device 100.

Figure 14:
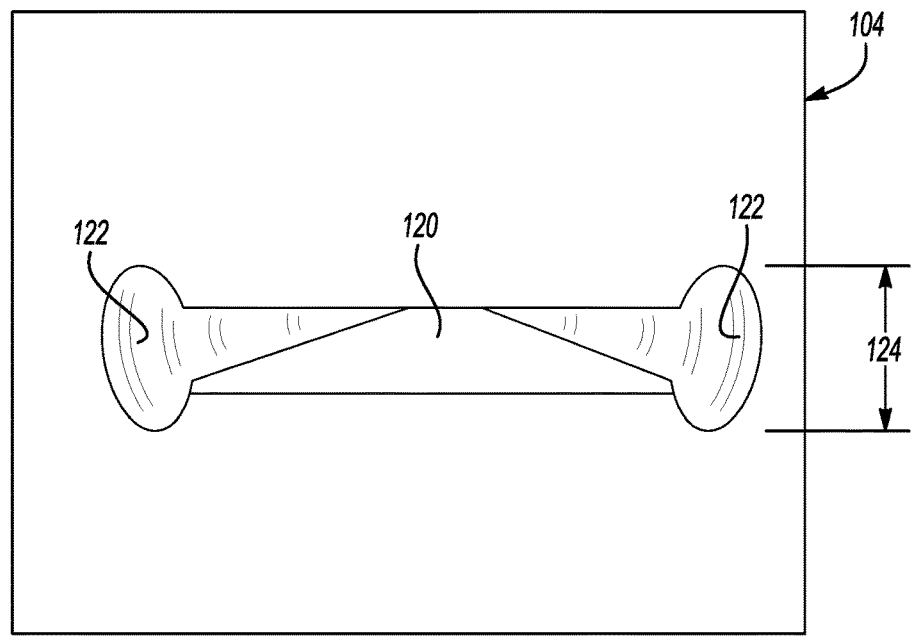
FIG. 14 illustrates a flow control feature of the device in a view taken along the lines 14-14 in FIG. 11.

FIG. 14 shows another flow control feature, which is included in the intermediate section 104 of the example device 100. The outside edges 122 of the flow path 111 through the intermediate section have an increased cross-sectional area compared to the cross-sectional area of the final edges of an insert 20 formed by the device 100. The outside edges 122 in this example have a rounded profile and a dimension 124 in the thickness direction (i.e., T in FIG. 2) of the resulting insert 20 that exceeds the spacing between the opposing surfaces 120 of the wedges 110. The profile and dimensions of the outside edges 122 decreases flow resistance along the outer edges, which contributes to ensuring that a consistent amount of material is provided near an exit of the device 100 across the entire width (i.e., W in FIG. 2) and thickness of the resulting insert 20.

Increasing flow resistance near a middle of the flow path 111 with the wedges 110 and decreasing flow resistance near edges of the flow path 111 with the size and profile of the outside edges 122 facilitate realizing a user-sized strip of material that is useful as a concrete expansion joint insert 20 that can be made of materials such as extruded recycled rubber and polyethylene. The flow control features of the device 100 prevent extrudant from flowing down a center of the flow path 111 at a faster rate than along the outer edges of the flow path 111. Diverting additional material toward the outside edges 112, 122 provides a more even or equal flow rate across the flow path 111. A consistent flow rate in the exit section 106 provides desired product characteristics of a concrete expansion joint insert designed according to an embodiment of this invention.

Figure 15:
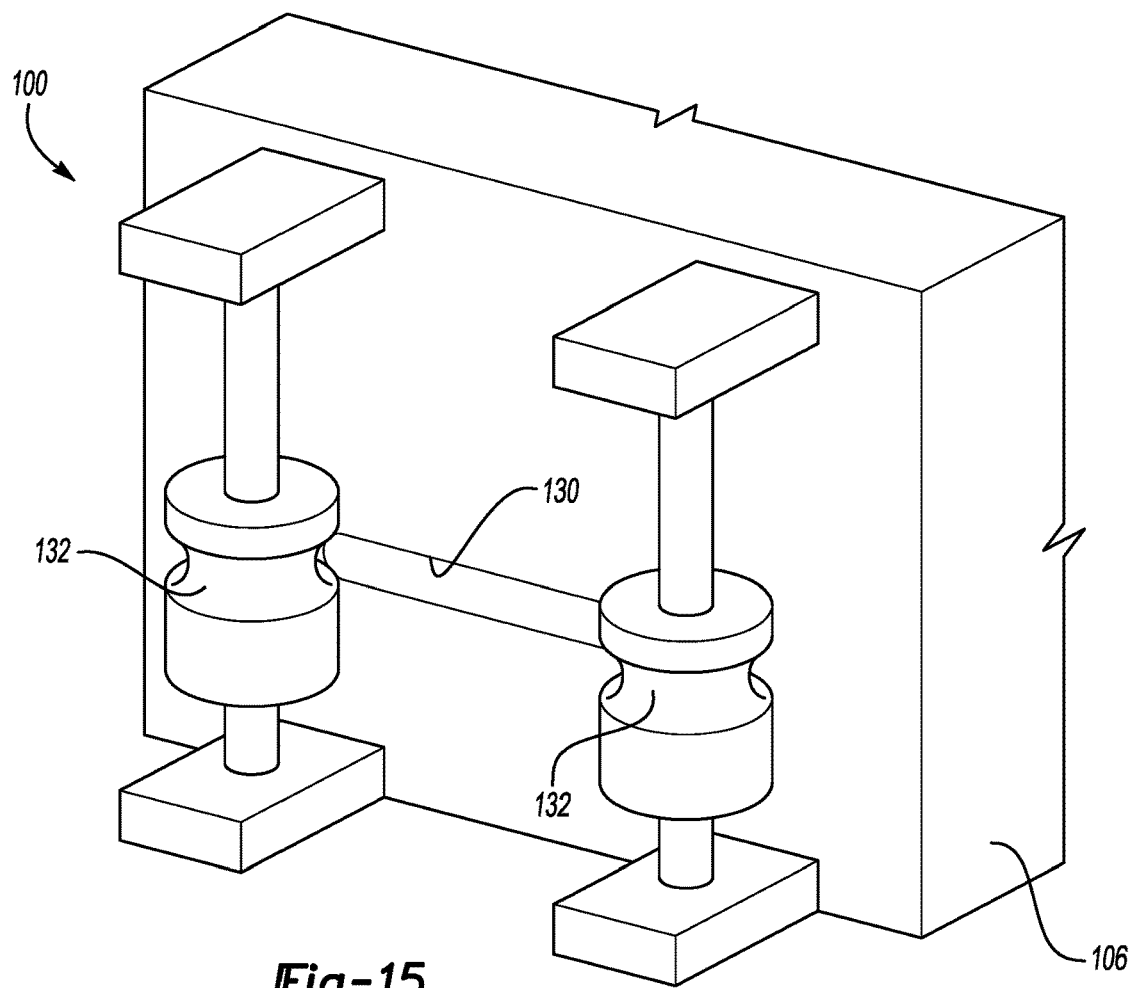
FIG. 15 illustrates features of the device of FIG. 11 as seen from an exit side.

FIG. 15 shows an exit side of the exit section 106 of the device 100. A final opening 130 has a profile corresponding to the desired final profile of the insert 20 including the width and thickness (W and T) of the insert 20. The dimensions of the opening 130 may vary from the final product dimensions depending on the selected material and whether the material shrinks during curing, for example.

The illustrated example also includes finishing rollers 132 that provide a profile finishing edge along which at least one of the longitudinal edges of the insert 20 is received as the extruded insert material exits the device 100. The rollers 132 in this example are passive and rotate in response to movement of the extruded material. In other examples, such rollers may be propelled to rotate.

In embodiments that include recycled rubber as a base material the die used for shaping the insert 20 is maintained at a controlled temperature to facilitate a desired flow rate of the extruded material through the die. In one example, a temperature of at least the flow path 111 established through the device 100 is between 320° F. and 400° F. The material flowing through the device 100 is kept in a range between 310° F. and 320° F. in one such example. Temperature control equipment, such as known heater elements, are included in some embodiments.

For some materials, such as recycled rubber, the combined effect of the wedges 110, the configuration of the outside edges 122 and the temperature control mentioned above allows for achieving a desired surface along the longitudinal edges 30, 32 of the insert 20. Depending on the material choice and desired configuration of the insert less than all of the wedges 110, the outside edges 122 and the temperature control may be enough to achieve a satisfactory quality product.

Figure 16:
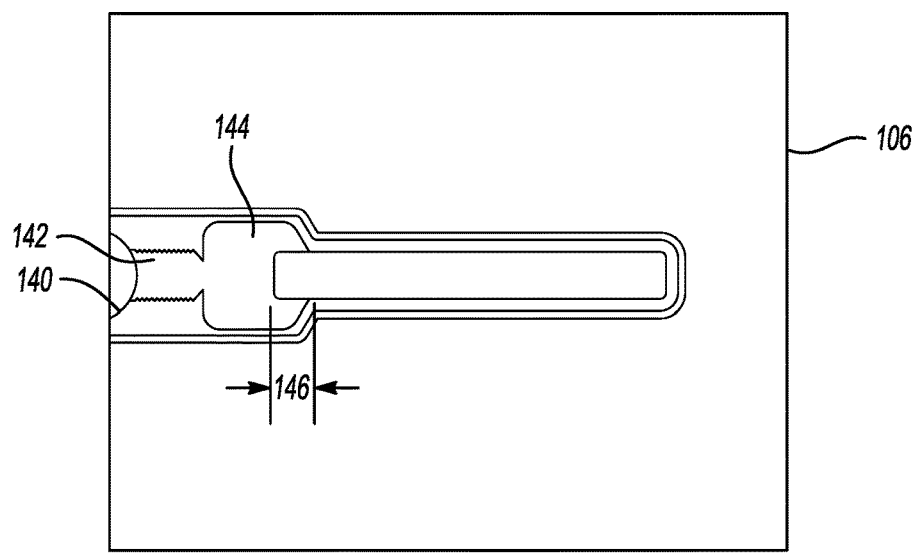
FIG. 16 illustrates another feature of the device of FIG. 11 in a view taken along the lines 16-16 in FIG. 11.

The example embodiment of FIG. 11 includes a second material port 140 also shown in cross-section in FIG. 16. The second material port 140 is configured to introduce a second material onto at least one longitudinal edge 30, 32 of the insert 20 prior to the body of the insert exiting the device 100. In this example, as the material, such as recycled rubber, proceeds through the flow path 111 of the device 100 a second material, such as recycled low density polyethylene is introduced into a side of the flow path 111 and onto the material of the body. In this way, the device 100 facilitates coextruding two different materials to form the insert 20. The extruder (not illustrated in FIG. 11) that delivers the second material into the port 140 may be a single screw or twin screw extruder, for example.

In the illustrated example, the second material port 140 includes a threaded connection 142 and opens into a groove 144 that intersects the flow path 111 at an interface between the intermediate portion 104 and the exit portion 106. The groove 144 intersects the flow path 111 near the exit of the device 100 in this example and introduces the second material into the flow path 111 at sufficient pressure to take up some of the space within the flow path 111 at the corresponding edge. The amount of the second material on the corresponding longitudinal edge 30, 32 may be controlled by controlling the pressure at which the second material is introduced into the groove 144. Those skilled in the art who have the benefit of this description will realize how to achieve a desired amount of second material (e.g., thickness or depth of a coating) on the resulting insert 20.

The example groove 144 is wider than the flow path 111 in a direction corresponding to the thickness of the insert 20 (e.g., vertically in FIG. 16). The groove 144 overlaps the flow path 111 along a depth shown by the dimension at 146 in FIG. 16. The dimension 146 defines a depth over the longitudinal sides of the insert body over which the second material extends adjacent the longitudinal edge 30, 32 to which the second material is applied.

The second extruded material applied to at least one of the longitudinal edges 30, 32 achieves the second surface characteristic, such as those described above. For example, the coating 50 shown in FIG. 7 comprises the second material coextruded through the port 140 and groove 144. In embodiments of the device 100 that have second material ports 140 and grooves 144 on both sides of the flow path 111, the resulting insert 20 will resemble the configuration illustrated in FIG. 6, for example.

The disclosed example embodiments have different surface characteristics to meet a variety of needs at various installation sites. It is therefore possible to use at least recycled rubber material for making concrete expansion joint inserts that facilitate achieving a desired visual appearance of an overall concrete installation. The inserts 20 are made to size without requiring cutting sheets of the insert material into individual strips.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. An assembly for making a concrete expansion joint insert, the assembly comprising:
   an extruder; and
   a device that receives material from the extruder, the device including
      a flow path through the device, and
      at least one internal feature that directs some of the material away from a middle of the flow path and toward outside edges of the flow path while allowing a remainder of the material to flow through the middle of the flow path to establish an approximately equal flow rate of the material through the middle and outside edges of the flow path.

2. The assembly of claim 1, wherein the internal feature comprises at least one wedge that interrupts a portion of the flow path.

3. The assembly of claim 2, wherein the internal feature comprises outside edge profiles that have a larger cross-sectional area than the middle of the flow path.

4. The assembly of claim 2, wherein
   the internal feature comprises two wedges;
   each of the wedges has a leading edge facing an entrance of the flow path;
   each of the wedges has side surfaces that have a varying dimension along a flow direction of the flow path; and
   the wedges have opposing surfaces that are spaced apart a distance corresponding to a thickness of the concrete expansion joint insert.

5. The assembly of claim 4, wherein
   the internal feature comprises rounded outside edge profiles having an edge profile dimension in a direction of the spacing between the opposing surfaces of the wedges, and
   the edge profile dimension exceeds the spacing between the opposing surfaces of the wedges.

6. The assembly of claim 2, wherein the at least one wedge has a leading edge that is rounded and planar side edges that have a decreasing dimension in a flow direction along the flow path.

7. The assembly of claim 1, wherein the extruder comprises
a first extruder that delivers a first material to the flow path for establishing a body of the insert; and
a second extruder that delivers a second material into the flow path near at least one longitudinal edge of the insert.

8. The assembly of claim 7, wherein
the second material is co-extruded with the first material through the device; and
the second material establishes a surface characteristic on the at least one edge that is different than a surface characteristic of another portion of the insert.

9. The assembly of claim 1, wherein dimensions of the flow path establish finish dimensions of the concrete expansion joint insert.

10. The assembly of claim 9, comprising finishing rollers near an exit of the flow path, the finishing rollers being configured to provide a profile finishing edge on the concrete expansion joint insert.

11. The assembly of claim 1, wherein the device comprises a second material port that is configured to introduce a second material onto at least one longitudinal edge of the insert.

12. The assembly of claim 11, wherein
the device includes a groove that receives the second material from the second material port,
the groove is larger than the flow path in a direction corresponding to a thickness of the insert' and
the groove overlaps the flow path.

13. The assembly of claim 1, wherein
the extruder comprises a first extruder and a second extruder,
the device comprises a secondary channel adjacent the flow path,
the first extruder introduces material into the flow path, and
the second extruder introduces a different material in to the secondary channel.

14. A method of making a concrete expansion joint insert, the method comprising:
extruding a material into a device,
directing the material along a flow path through the device, and
directing some of the material away from a middle of the flow path and toward outside edges of the flow path while allowing a remainder of the material to flow through the middle of the flow path to establish an approximately equal flow rate of the material through the middle and outside edges of the flow path.

15. The method of claim 14, comprising using an internal feature within the flow path to direct the material away from the middle of the flow path toward the outside edges of the flow path.

16. The method of claim 15, wherein the internal feature comprises at least one wedge that interrupts a portion of the flow path.

17. The method of claim 16, wherein the internal feature comprises outside edge profiles that have a larger cross-sectional area than the middle of the flow path.

18. The method of claim 14, wherein directing the some of the material away from the middle of the flow path and toward outside edges of the flow path while allowing the remainder of the material to flow through the middle of the flow path establishes a consistent density of all of the material in the flow path.

19. The method of claim 14, wherein allowing the remainder of the material to flow through the middle of the flow path comprises allowing the remainder of the material to flow through a space between opposing surfaces of an internal feature of the flow path.

20. The assembly of claim 1, wherein the at least one internal feature establishes a consistent density of all of the material in the flow path on a downstream side of the at least one internal feature.

21. The assembly of claim 1, wherein the at least one internal feature includes a space between opposing surfaces of the at least one internal feature and the remainder of the material flows through the space between the opposing surfaces.

22. An assembly for making a concrete expansion joint insert, the assembly comprising:
an extruder; and
a device that receives material from the extruder, the device including
a flow path through the device, and
at least one internal feature that directs the material away from a middle of the flow path and toward outside edges of the flow path to establish an approximately equal flow rate of the material through the middle and outside edges of the flow path,
wherein
the internal feature comprises two wedges;
each of the wedges has a leading edge facing an entrance of the flow path;
each of the wedges has side surfaces that have a varying dimension along a flow direction of the flow path; and
the wedges have opposing surfaces that are spaced apart a distance corresponding to a thickness of the concrete expansion joint insert.

23. An assembly for making a concrete expansion joint insert, the assembly comprising:
an extruder; and
a device that receives material from the extruder, the device including
a flow path through the device;
at least one internal feature that directs the material away from a middle of the flow path and toward outside edges of the flow path to establish an approximately equal flow rate of the material through the middle and outside edges of the flow path, wherein dimensions of the flow path establish finish dimensions of the concrete expansion joint insert; and
finishing rollers near an exit of the flow path, the finishing rollers being configured to provide a profile finishing edge on the concrete expansion joint insert.

\* \* \* \* \*